(12) United States Patent
Winkler

(10) Patent No.: US 11,108,217 B2
(45) Date of Patent: Aug. 31, 2021

(54) CABLE HOLDING ELEMENT AND METHOD

(71) Applicant: Novomatic AG, Gumpoldskirchen (AT)

(72) Inventor: Heinz Winkler, Gumpoldskirchen (AT)

(73) Assignee: Novomatic AG, Gumpoldskirchen (AT)

( * ) Notice: Subject to any disclaimer, the term of this patent is extended or adjusted under 35 U.S.C. 154(b) by 0 days.

(21) Appl. No.: 16/259,154

(22) Filed: Jan. 28, 2019

(65) Prior Publication Data

US 2019/0181625 A1   Jun. 13, 2019

Related U.S. Application Data

(63) Continuation of application No. 15/370,296, filed on Dec. 6, 2016, now Pat. No. 10,205,309, which is a
(Continued)

(30) Foreign Application Priority Data

Jun. 8, 2011 (EP) .................................. 1450072

(51) Int. Cl.
*F16L 3/00* (2006.01)
*H02G 3/04* (2006.01)
(Continued)

(52) U.S. Cl.
CPC ............... *H02G 3/045* (2013.01); *F16L 3/02* (2013.01); *F16L 3/1218* (2013.01);
(Continued)

(58) Field of Classification Search
CPC ......... H02G 3/045; H02G 3/0406; F16L 3/02; F16L 3/1218; F16L 3/1236; F16L 3/237; F16L 3/223; G07F 17/3202
See application file for complete search history.

(56) References Cited

U.S. PATENT DOCUMENTS

| 2,896,009 A | 7/1959 | Caveney |
| 4,484,020 A | 11/1984 | Loof |

(Continued)

FOREIGN PATENT DOCUMENTS

| DE | 1851657 | 5/1962 |
| DE | 2545398 | 4/1977 |

(Continued)

OTHER PUBLICATIONS

Office Action for U.S. Appl. No. 14/099,941 dated Oct. 1, 2015; 12 pps.

(Continued)

*Primary Examiner* — Yuriy Semenenko
(74) *Attorney, Agent, or Firm* — RowanTree Law Group, PLLC; Magdalena M. Fincham

(57) ABSTRACT

A cable holding element configured for attachment to either an angled frame having internal corners, or external corners or both. The cable holding element includes a base body and rows of latching projections that project from the base body to define at least one channel area for holding cable. The latching projections each have a first section and a second section. The first section and the second section form an acute angle towards the base body. A first row of latching projections opposes a second row of latching projections. The opposing latching projections cooperate to interlock without contact, in a comb-like manner to hold cable within the cable holding element and to form guiding structure that guides cable into and out from the channel area. In an alternate embodiment, the cable holding element has a flat base body capable of attachment to a planar surface.

22 Claims, 5 Drawing Sheets

Related U.S. Application Data continuation of application No. 15/152,611, filed on May 12, 2016, now Pat. No. 9,520,701, which is a continuation of application No. 14/099,941, filed on Dec. 7, 2013, now abandoned, which is a continuation of application No. PCT/EP2012/060739, filed on Jun. 6, 2012.

(51) Int. Cl.
| | | |
|---|---|---|
| *F16L 3/02* | (2006.01) | |
| *F16L 3/223* | (2006.01) | |
| *G07F 17/32* | (2006.01) | |
| *F16L 3/12* | (2006.01) | |
| *F16L 3/123* | (2006.01) | |
| *F16L 3/237* | (2006.01) | |

(52) U.S. Cl.
CPC ............ *F16L 3/1236* (2013.01); *F16L 3/223* (2013.01); *F16L 3/237* (2013.01); *G07F 17/3202* (2013.01); *H02G 3/0406* (2013.01)

(56) References Cited

U.S. PATENT DOCUMENTS

| | | | | |
|---|---|---|---|---|
| 5,023,404 A | * | 6/1991 | Hudson | H02B 1/202 |
| | | | | 174/68.3 |
| 5,181,680 A | * | 1/1993 | Coll | F16L 3/243 |
| | | | | 248/61 |
| 6,140,584 A | * | 10/2000 | Baldissara | H02G 3/045 |
| | | | | 174/68.3 |
| 6,318,680 B1 | | 11/2001 | Benedict | |
| 6,371,419 B1 | * | 4/2002 | Ohnuki | F16L 3/13 |
| | | | | 248/71 |
| 6,467,633 B1 | | 10/2002 | Mendoza | |
| 7,348,488 B2 | | 3/2008 | Benito-Navazo | |
| 7,973,242 B2 | | 7/2011 | Jones | |
| 8,020,813 B1 | * | 9/2011 | Clark | H02G 11/00 |
| | | | | 248/74.2 |
| 8,985,530 B2 | | 3/2015 | Jette | |
| 2001/0002657 A1 | | 6/2001 | Mendoza | |
| 2003/0230678 A1 | * | 12/2003 | Bellmore | F16L 3/1203 |
| | | | | 248/68.1 |
| 2004/0232287 A1 | * | 11/2004 | Rosemann | F16L 3/02 |
| | | | | 248/68.1 |
| 2009/0200057 A1 | * | 8/2009 | Caveney | H02G 3/045 |
| | | | | 174/101 |
| 2012/0175470 A1 | | 7/2012 | Jette | |
| 2016/0183393 A1 | * | 6/2016 | Groom | B62B 9/26 |
| | | | | 280/33.992 |

FOREIGN PATENT DOCUMENTS

| | | |
|---|---|---|
| EP | 0893865 | 1/1999 |
| FR | 81584 | 9/1963 |
| JP | Y1992041706 | 9/1992 |
| JP | H10252947 | 9/1998 |
| JP | 200402381 | 1/2004 |
| JP | A2008178251 | 7/2008 |
| WO | WO1991004597 | 4/1991 |

OTHER PUBLICATIONS

Final Office Action for U.S. Appl. No. 14/099,941 dated Apr. 5, 2016; 13 pps.
Office Action for U.S. Appl. No. 15/370,296 dated Apr. 9, 2018; 9 pps.
Notice of Allowance for U.S. Appl. No. 15/370,296 dated Oct. 4, 2018; 9 pps.
Notice of Allowance for U.S. Appl. No. 15/152,611 dated Oct. 7, 2016; 12 pps.
International Search Report and Written Opinion for WO2012168320 dated Jul. 4, 2012; 6 pps.

* cited by examiner

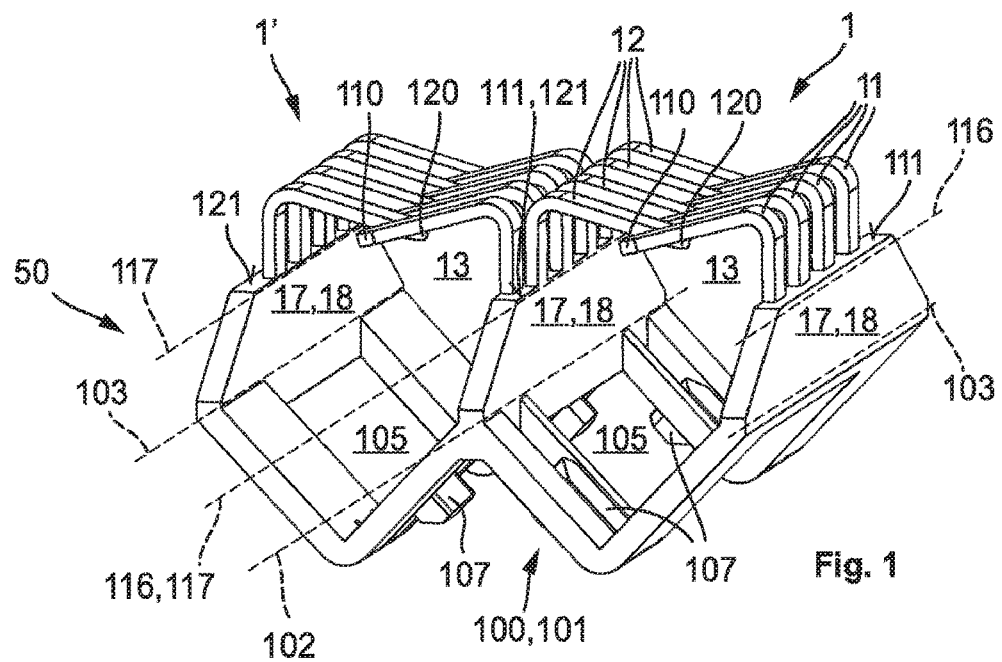
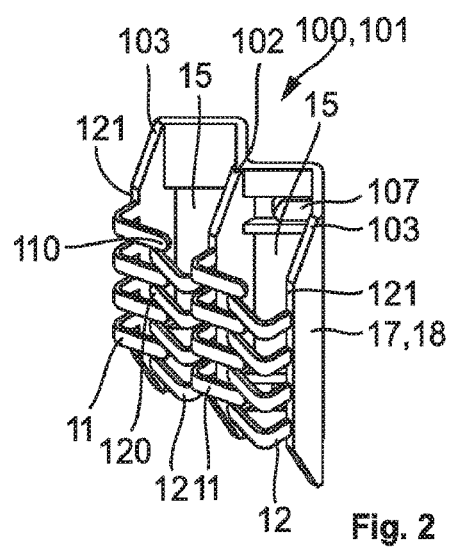
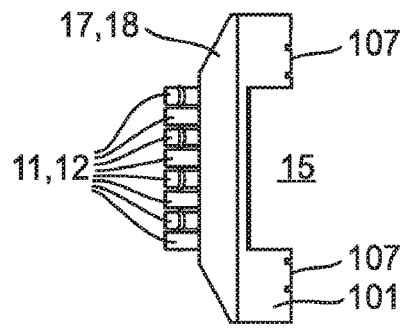
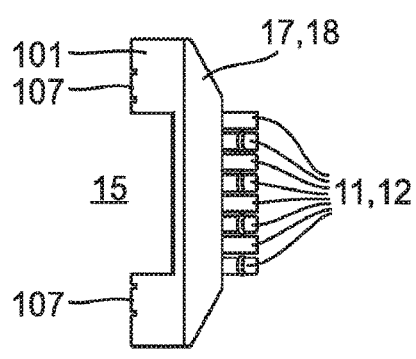
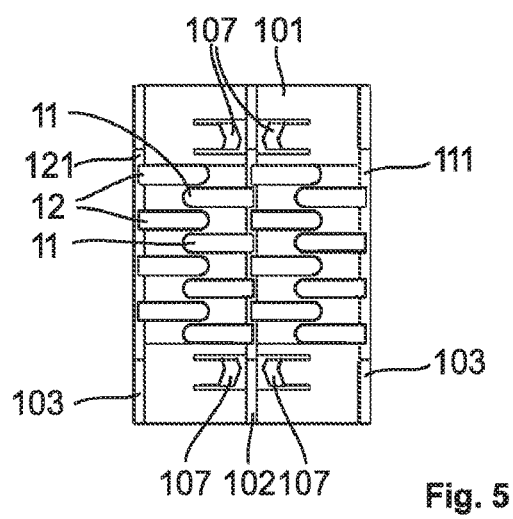

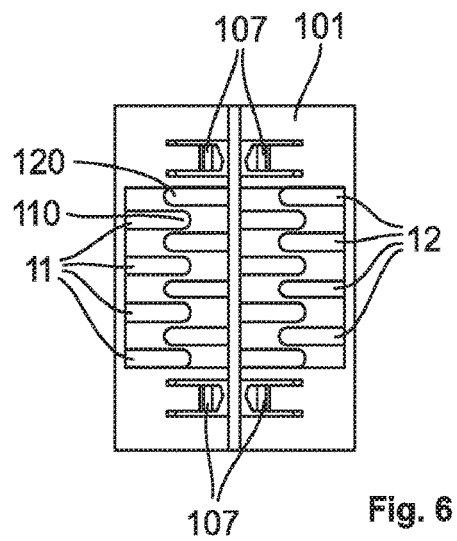
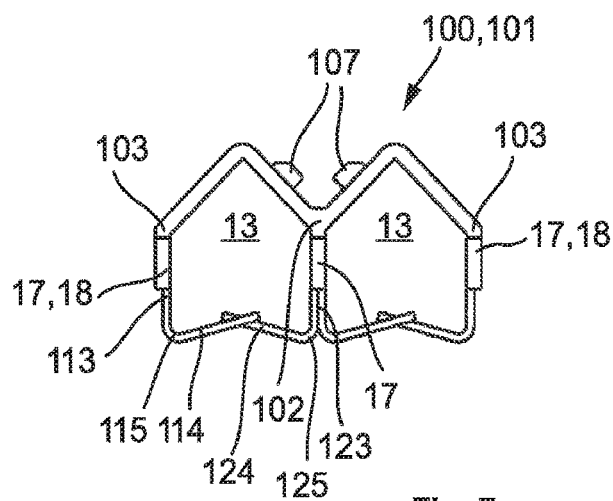
Fig. 6
Fig. 7
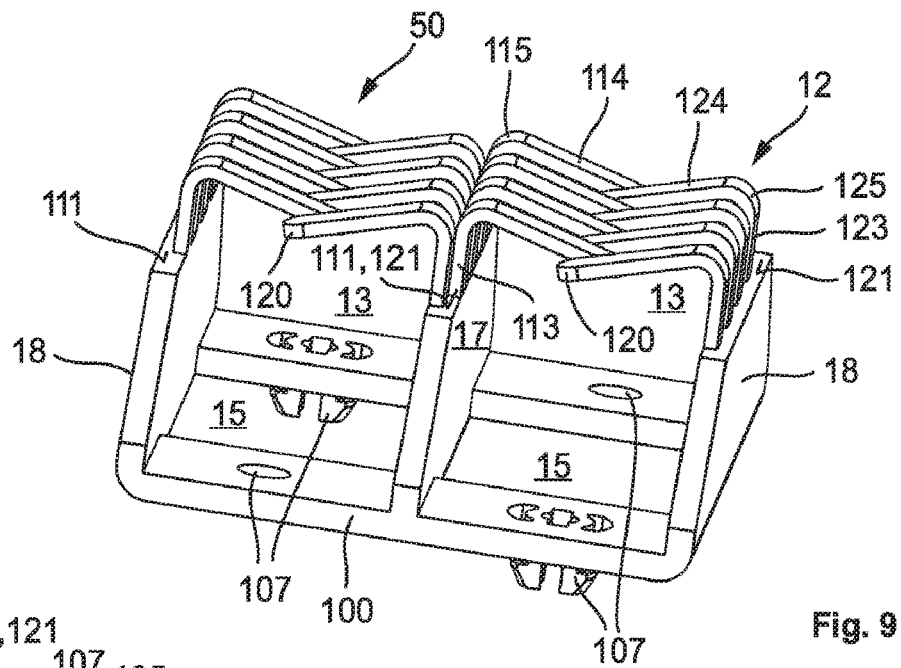
Fig. 9
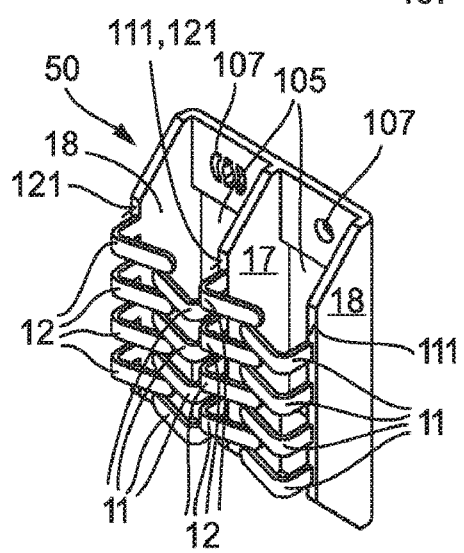
Fig. 10
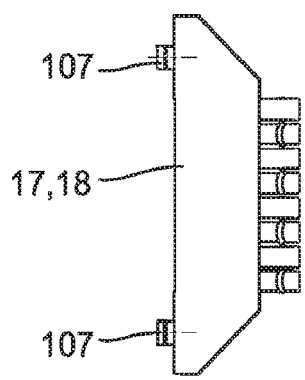
Fig. 11

CABLE HOLDING ELEMENT AND METHOD

Claim of Priority

This patent application is a continuation of co-pending U.S. patent application Ser. No. 15/370,296, filed 6 Dec., 2016, which is a continuation of U.S. patent application Ser. No. 15/152,611, filed 12 May 2016 and granted as U.S. Pat. No. 9,520,701 on 13 Dec., 2016, which is a continuation of abandoned U.S. patent application Ser. No. 14/099,941, filed on 7 Dec. 2013, which is a continuation of expired patent application PCT/EP2012/060739, filed on 6 Jun. 2012, which claims priority to European Patent Application No. 11450072.1, filed on 8 Jun. 2011. The disclosures of these related applications are incorporated herein by reference.

FIELD OF THE INVENTION

The invention relates to methods and devices including cable holding elements, and particularly to cable holding elements used in kiosk-style machines.

BACKGROUND OF THE INVENTION

Cable guides for gaming machines are known in the current state of technology, whereby cable strands are held together with cable ties or cable spirals. The cable strands are connected to the housing of the device by retaining plates or clips.

A disadvantage of known cable guides is that disconnecting and re-connecting cable strands within gaming machine housings is difficult because manipulating cable ties and spirals often requires more space than is available in such housings.

What is desired is a cable holding element in which the cable strands can be readily installed, connected, and removed again.

Security is another disadvantage of the current state of technology. In gaming machines, generic fixed cable harness arrangements inside the housing of a device do fix individual cables in predictable positions. With knowledge of the position of the cable, unauthorized manipulation from outside the case is possible. A hacker can drill into the case at a suitable position to access particular cables. If a person manipulating the device knows the respective position where a cable or cable strand runs, there is a danger of this person manipulating a plurality of other devices this way.

A further goal of the invention is improved device security.

SUMMARY OF THE INVENTION

The present invention provides for a cable holding device (element) adapted for use within a casino-style gaming machine, for the accommodation of one or more cables. The cable holding device includes a base body as well as a number of latching projections projecting from the base body. The latching projections extend in rows that oppose each other, whereby the latching projections and base body cooperate to define a channel area for guiding the cables. The base body is L- shaped, W-shaped, or has another shape effective at defining at least one channel area.

The latching projections are configured to have ends that interlock without contact, such as in a comb-like manner. The ends of a first row of latching projections oppose and extend between the ends of a second row of latching projections to define the channel area. The latching projections are flexible to enable insertion and removal of a cable into, and out from, the channel area.

The latching projections are flexible to a quick change of cable from the cable holding device with relatively little effort. Further individual cable strands may be exchanged.

Thus quickly or with relatively little effort a configuration or modification of the cable route of one or several cables can be achieved, whereby the cable strands are removed from the cable holding elements inside the housing of the device and are laid in other cable holding elements in the same case. Thus it is possible to remedy manipulation very easily because the cable holding elements allow a plurality of possible configurations and thereby cable strands can be laid in a more or less random position in a device. Hereby a targeted manipulation of the device is made difficult.

In addition, the invention offers the advantage that an easy and flexible installation of multiple cables and cable strands in a device housing of the same electronic device is possible. A particular advantage is given by exchanging cables, such as while exchanging wired components of the device, whereby individual cables can be very easily removed from the cable holding elements through the latching projections.

The cable holding element or the cable channel does not require any separate closing or locking elements, such as closing clips, through which a simple operation is allowed and the installation time is reduced.

A particular aspect of the invention foresees that the latching projections confining the channel area are L-shaped, which latching projections are at a distance opposite each other, so that the channel area features a closed and/or U-shaped channel cross-section. This advantageous embodiment of the latching projections or of the channel cross-section allows the simple laying or removal of the cable strand, or the cables, into the channel area or out of the channel area.

Furthermore, it can be provided that in the longitudinal direction of the channel area the latching projections are arranged in such a manner, so that these, preferably without contact, interlock in a comb-like manner, so that the end of at least one latching projection is arranged and/or protrudes between two respectively opposite latching projections. Thereby the unintentional falling out of the cables or cable strands, caused for example by shaking, from the cable channel is prevented.

It can be further provided that the latching projections are constructed to be elastically bendable respectively to be resilient, so that these can be swinging against the base body of the cable holding element and after the swinging return to their initial position. Hereby the laying of cables into the cable channel is facilitated, whereby a cable can be pressed through the intermediate area between two latching projections.

A particularly advantageous embodiment of the latching projections, which prevent shifting or sliding of the cable strands from the cable channel, foresees that the latching projections are developed in a curved shape, in particular in an angled-hook shape, and feature two latching projection sections, whereby the first latching projection section projects in an angle of 70°-90°, preferably 85°-90°, in particular, exactly vertically and/or normally, from the respective area and whereby the second latching projection section continues at the distant end of the respective area of the first latching projection section and projects in an angle, in particular with an angle between 70° to 110°, preferably 90°, to the first latching projection section in direction towards the latching projections, which project from the respective areas opposite each other.

A constructively particular simple embodiment of the latching projections foresees that the two latching projection sections are developed integrally, in particular developed from a flat body and/or a profile rod, that features an arc between the first and the second latching projection section.

So as to facilitate the penetration of the cable strands into the cable channel of the cable holding element it can be foreseen that the two latching projection sections enclose an angle of less than or equal to 90°.

So as to enable a particular simple cable conduit and enable a development of longer cable holding elements with a longer extension in cable direction it can be foreseen that the two areas of which the latching projections project run parallel to another and/or lie at one level.

So as to achieve a balanced pressure of the base body of the cable channel when inserting the cables or cable strands or the removal of the cables or cable strands and to achieve a simple constructive embodiment of the cable channel it can be foreseen that the respective number of latching projections, which project from both areas, deviate by no more than one from another.

So as to facilitate the positioning of the cable strands into the cable channel or the cable holding element it can be foreseen that the ends of the latching projections or the ends of the second latching projection sections are inclined towards the base body.

So as to prevent an unintentional shifting or sliding of the cable strands or cables, in particular by vibrations, it can be foreseen that for each latching projection, of which the end is arranged between two latching projections projecting from the respective area opposite each other, another projecting latching projection from the opposite area is foreseen, of which the end is approximated to the end of the respective latching projection and is opposite, whereby, in particular, the front sides of the ends of the other latching projection and the latching projection are opposite each other.

So as to achieve a constructively simple embodiment of such a cable channel it can be foreseen that the other latching projections have each a first latching projection section, that projects from the base body in an angle, in particular an angle of 70° to 110°, preferably 90°, and feature a second latching projection section that continues the first latching projection section and projects from the first latching projection section.

A simplification of the constructive development foresees that the form and/or the alignment of the first and/or second latching projection section of the other latching projections corresponds to the form and alignment of the first and/or second latching projection sections of the latching projections.

A further added or alternative simplification of the construction foresees that the length of the first latching projection section of the other latching projections corresponds to the length of the first latching projection section of the latching projections.

A further simplification of the structure of the cable holding element according to the invention foresees that the latching projections projecting from the first area and/or the second area are developed and/or arranged equally, and/or that all latching projections are designed equally.

For the same purpose it can be additionally or alternatively foreseen that the other latching projections projecting from the first area and/or from the second area are constructed and/or aligned equally, and that all other latching projections are developed equally.

For the development of longer cable holding elements, which have a longer longitudinal extension in direction of the cable it can be foreseen that latching projections project from two areas, whereby a number of first latching projections project from the first of the two areas and a number of the second latching projections project from the second of the two areas.

For the prevention of shifting and sliding of cables or cable strands from the cable channel it can be foreseen that the first latching projections project from subareas of the first area, which lie on a first straight line and/or that the second latching projections project from subareas of the second area, which lie on a second straight line, whereby the first straight line and the second straight line are preferably arranged in a parallel manner to each other.

Additionally or alternatively, for the same purpose it can be foreseen that a number of the other latching projections and/or from subareas of the second area project, which lie on the first straight line, and the remaining of the other latching projections project from subareas of the second area, which lie on the second straight line.

So as to obtain a space-saving construction, which prevents a twisting or jamming of cables, which are placed outside the cable holding element, it can be foreseen that between each two latching projections a respective further latching projection is arranged.

Thereby it can be particularly foreseen that the second latching projection section of the latching projections, if applicable, also the second latching projection sections of the other latching projections, lie at the same level.

For the reduction of material requirements of the base body it can be foreseen that the base body has at least one recess in the areas opposite the latching projections.

For the stabilisation of the latching projections as well as the prevention of a breaking-off of the latching projection when inserting and extracting cable strands or cables, it can be foreseen that the base body features at least one, in particular two, in particular vertically and/or normally, projecting projections from it, of which the individual latching projections and, if applicable, the other latching projections project.

For a simplified guiding of the cables it can be foreseen that the channel cross-section of the channel area narrows and/or extends at least in a subarea along the longitudinal extension of the channel area.

So as to achieve a simple insertion and extraction of the cables into the cable holding element or out of the cable holding element it can be foreseen that the latching projections are developed to be elastically bendable and/or to be resilient.

So as to prevent a breaking-off of the latching projection when inserting or extracting the cable strands or cables it can be foreseen that the relation of the width in longitudinal direction of the cable holding element to the thickness of the latching projections is between 4:1 to 4:1.5, in particular 4:1.3.

So as to guarantee a sufficient elastic bendability it can be in particular foreseen that the latching projections, if applicable the other latching projections and/or the entire cable holding element, are made from synthetic materials, in particular polyethylene PE and/or polypropylene PP.

Furthermore the invention relates to a cable holding arrangement comprehending a number of cable holding elements in accordance with the invention.

So as to achieve a cabling non-identifiable or non-predictable for externals it can be foreseen that the individual cable holding elements are arranged equally aligned on a common base body.

So as to achieve an easy or simple fastening of the cable holding element to a device it can be foreseen that the base body features fastening devices, in particular releasable without tools, for the fastening of the cable holding to a device, in particular with a frame of device.

In order to reduce the bill of materials cost it can be foreseen that the common base body has at least one recess in the areas opposite the latching projections.

For the fastening of a cable holding element in corner areas of a device it can be foreseen that the common base body forms a W-shaped angle profile and, in addition, latching projections of each of the cable holding elements project from the central bow edge of the W-shaped angle profile.

Hereby a particular large cable cross-section can be achieved, if projections project from the bow edge and/or the trailing edge of which the latching projections project.

A particularly advantageous adjustment in the corner areas of a right-angled device is achieved if the W-shaped angle profile in the area of the central bow edge, preferably also in both trailing edges, features a right angle.

For the fastening of a cable holding to evenly developed surfaces of the device it can be foreseen that the common base body is developed in a flat manner and/or even manner and the individual latching projections project from the same side of the base body.

In order to achieve a plurality of different cabling possibilities and thereby counteract an intentional manipulation by third parties it can be foreseen that the individual cable holding elements are arranged equally and, if applicable, are arranged side by side and/or consecutively.

For the same purpose it can be additionally or alternatively foreseen that the first and the second straight line are arranged in a parallel manner to each other.

Finally the invention refers to an electronic device, in particular a betting and gaming machine or a betting and gaming device that at least comprehends a cable holding according to invention or at least a plurality of cable holding elements according to invention. Such an electronic device has a plurality of cabling possibilities, which allow the manufacturer of the device to equip his devices with different cable positions so as to prevent a manipulation occurring always in the same manner of his betting and gaming devices.

In the following four embodiments of the invention are described in greater detail with the following drawings.

BRIEF DESCRIPTION OF THE DRAWINGS

FIG. 1 shows a cable holding with a W-shaped cross-section in an angled view.

FIG. 2 shows the cable holding shown in FIG. 1 from a different perspective in an angled view.

FIG. 3 shows the cable holding shown in FIG. 1 in a lateral view.

FIG. 4 shows the cable holding shown in FIG. 1 in a lateral view from the other side.

FIG. 5 shows the cable holding shown in FIG. 1 from an above view.

FIG. 6 shows the cable holding shown in FIG. 1 from a below view.

FIG. 7 shows the cable holding shown in FIG. 1 with a view of the channel area.

FIG. 9 shows a second embodiment of the invention in an angled view.

FIG. 10 shows the embodiment of the invention shown in FIG. 9 from a different perspective in an angled view.

FIG. 11 shows the embodiment of the invention shown in FIG. 9 from the side.

DETAILED DESCRIPTION

Figure 8:
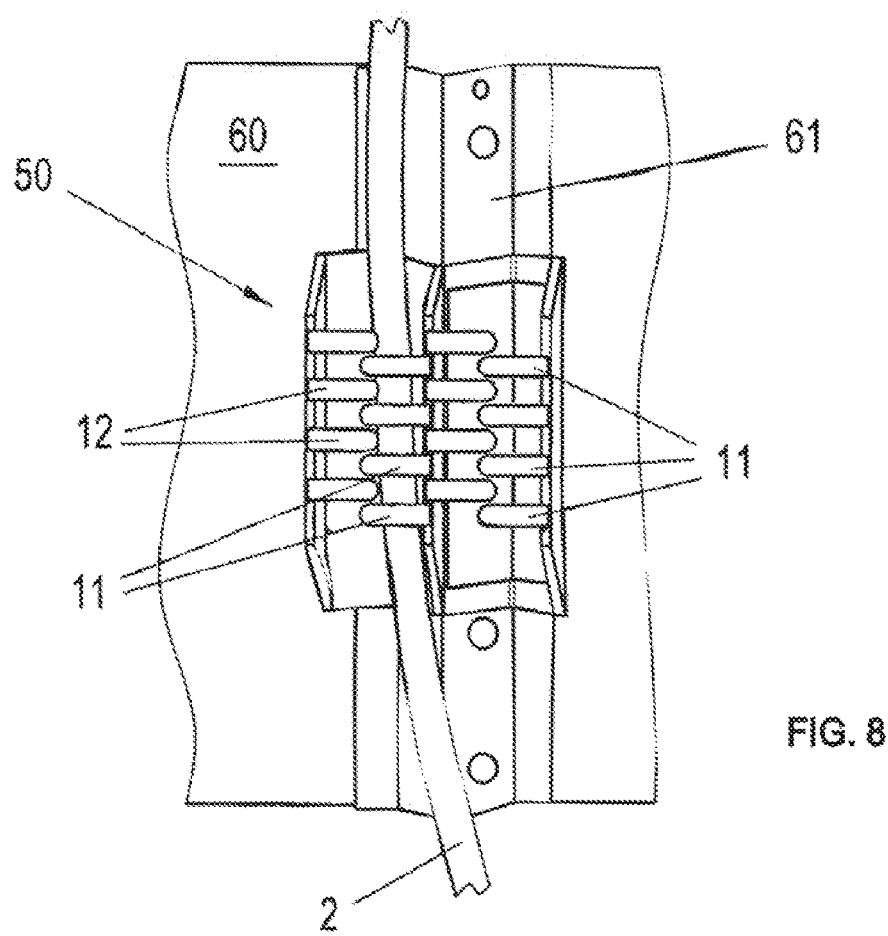
FIG. 8 shows the interior of an electronic device, in the corner area of which a cable holding element, as shown in FIG. 1, is installed.

In FIG. 1 a first embodiment according to invention of a cable holding 50 with two cable holding elements 1 and 1' is shown. The cable holding elements 1 and 1' feature a common base body 100, whereby two channel areas 13 and 13' divided from each other are developed. The base body 100 features a W-shaped angle profile 101, which features a central bow edge 102 as well as two trailing edges 103. The central bow edge 102 lies parallel to the trailing edges 103 and lies with these at the same level.

Both channel areas 13 and 13' are each confined by one half of the W-shaped profile 101 as well as the projections 17 and 18. The projections 17 and 18 project from the bow edge 102 and the trailing edges 103. In one embodiment, the projections 17 and 18 project from the central bow edge 102. In another embodiment, the lateral projections 17 and 18 project from one of the two respective trailing edges 103.

These projections 17 and 18 in the present embodiment are developed normally in an upright manner to the level determined by the central bow edge 102 as well as both trailing edges 103 and are attached to the central bow edge 102 or to the trailing edges 103 to extend the edges 102 and 103, respectively. The projections 17 and 18 extend in a profile longitudinal direction of the W-shaped profile 101 across the entire length of the profile and stand normally at the level determined by the central bow edge 102 and the trailing edge 103.

At the respective distant end of the bow edge 102 or the respective trailing edge 103 of the respective projection 17 and 18 a surface with an area 111 and 121 is developed, from which individual projections 11 and 12 project.

The first cable holding element 1 confines the first channel area 13. The first channel area 13 is on the distant end of the trailing edge 103 of the projection 17 and 18. The areas on the central projections 17 and 18 are referred to as areas opposite to each other 111 and 121. Similarly, in relation to the second cable holding element 1' that confines the second channel area 13', the area on the distant end of the trailing edge 103 of the projection 17 and 18 and the area on the central projection 17 and 18 are referred to as areas opposite to each other 111 and 121.

FIG. 7 shows the latching projections 11 and 12. The latching projections 11 and 12 each include a respective first latching projection section 113 and 123, as well as a respective second latching projection section 114 and 123. The latching projections 11 and 12 are developed in an L-shape or in an angled-hook shape and feature each two respective latching projection sections 113, 114, 123, and 124. Each latching projection 11 and 12, respectively features a first latching projection section 113 and 123 and a second latching projection section 114 and 124. The first latching projection sections 113 and 123 stand vertically and/or normally to the areas 111 and 121 from which they project. The second latching projection sections 114 and 124 continue the first latching projections 113 and 123 at its respective distant end.

The latching projection sections 113, 114, 123, 124 are developed integrally and are developed from a flat body. In the present case curved profile rods are used as latching projections 11 and 12. These profile rods or flat bodies feature between the first and the second latching projection sections 113, 114, 123, and 124 each have an arc 115 and 125. The arcs 115 and 125 are developed in such a manner that the two latching projection sections 113, 114, 123, and 124 enclose an angle of no less than 90°. Preferably, the angle is approximately 75°.

The second latching projection sections 114 and 124 project from the end of the first latching projection section in direction of the respective opposite area 111 and 121. The individual latching projections 11 and 12 are arranged in a comb-like manner, that is they are arranged at a distance from each other and are aligned equally, whereby all latching projections 11 and 12 projecting from the same area 111 and 121 of the first cable holding element 1 and 1' have the same distance to the respectively adjacently arranged latching projections 11 and 12.

The latching projections 11 and 12 project from points and/or subareas on the areas 111 and 121, which are each arranged on a common straight line 116 and 117. The latching projections 11 and 12 opposite each other interlock without contact, whereby the ends 110 and 120 of the latching projections 11 and 12 or the ends 110 and 120 FIG. 2. are approximated to the second latching projections 114 and 124 without contact.

Each end 110 and 120 of the respective latching projections 11 and 12 is arranged between two latching projections 11 and 12 of the respective opposite area 111 and 121 or protrudes into the intermediate area between two projecting latching projections 11 and 12 of the opposite area 11 and 12. The individual ends 110 and 120 of the latching projections 11 and 12 or the second latching projection sections 114 and 124 are arranged so that these do not contact the projecting latching projections 11 and 12 of the opposite areas 111 and 121. In the present embodiment all latching projections 11 and 12 are equally developed and aligned and do not contact each other.

On the projections 17 and 18, which project from the central bow edge 102, are latching elements 11 and 12. These latching elements 11 and 12 define the first channel area 13 and the other channel area 13'. The side facing away from the central bow edge 102 of the central projections 17 and 18 develops thereby an area 111 and 121 from which latching projections 11 and 12 project to define of the first channel area 13 as well as for the defining of the second channel area 13'.

The arrangement of the latching projections 11 and 12 occurs in such a manner that the channel areas 13 and 13' features a close and/or U-shaped channel cross-section.

In one embodiment of the invention, both of the two cable holding elements 1 and 1' of the cable holding 50 include each four first latching projections 11 and four second latching projections 12. The ends of the second latching projection sections 123 and 124 are inclined towards the common base body 100 or to the level determined by the trailing edges 103 as well as the central bow edge 102.

Four fastening elements 107 are arranged in the area of the W-shaped profile 101. The W-shaped profile facilitates a tool-free and releasable fastening of the cable holder 50 with a device 60 or with its frame 61. This achieves the goal of simple assembly.

A preferred arrangement of the cable holder 50 shown in FIGS. 1 to 7 is shown in FIG. 8. The device in this case includes a frame 61 and multiple wall elements, which form a device housing and encloses a device interior.

The individual edges of the W-shaped profile 101 of the cable holder 50 are aligned at a right angle to each other.

FIG. 8. shows the cable holder 50 mounted on an angled corner profile of the frame 61 of a device 60, whereby the individual fastening means 107 engage into the recesses on the corner profile of the frame 61 and thus allow a releasable fastening of the cable holder 50 on the frame 61. In addition, FIG. 8 shows a cable 2 that is guided into one of the two channel areas 13 of the cable holder 50.

The base body 10 and 100 of the cable holder 50 features a recess at the areas opposite the latching projections 11 and 12. Furthermore, additional recesses are foreseen in which the fastening means 107 for the fastening at the frame 61 of the device 60 are located. The channel cross-section of both channel areas 13 and 13' of the embodiment of the invention shown in FIGS. 1 to 7 remains the consistent across the entire longitudinal direction of the respective channel areas 13 and 13'.

The latching projections 11 and 12 in the present embodiment of the invention are developed to be elastically bendable and to be resilient and consist of synthetic materials such as polyethylene. The latching projections 11 and 12 have a spring effect so that the latching projections 11 and 12 may flex and return to their initial position after their deflection and swivelling in the course of the insertion of the cables 2 into the channel areas 13 and 13'. The consistency of the polyethylene is thereby selected in such a manner so that the latching elements have a bending stiffness and elasticity that allow a swivelling of the individual latching elements 11 and 12 so that a cable can be inserted through pressure onto the latching elements 11 and 12 in the channel areas 13 and 13'.

Alternatively the cable holding element 1 can also be made from polypropylene or other elastically bendable and resilient synthetic materials. In the present case not only the latching projections 11 and 12 but also the entire cable holder 50 may be developed from synthetic materials.

In FIGS. 9 to 16 a second embodiment according to invention of a cable holding 50 is shown. The second embodiment of the invention corresponds with the first embodiment of the invention with the exception of the deviations outlined below.

The common base body 100 of this cable holding 50 is developed in a flat and even manner. The individual latching projections 11 and 12 are also arranged on areas 111 and 121 on projections 17 and 18, which run in a parallel manner to the level determined by the base body 100. The common base body 100 features a number of fastening means 107 with which the cable holding 50 can be arranged at the frame 61 of a device 60 releasable without tools. The cable holding 50 defines two channel areas 13 and 13', which are arranged in a parallel manner, and which are divided from each other by centrally arranged projections 17 and 18. The three projections 17 and 18 of the base body 100 project from it and carry at the distant end to the base body 100 the individual latching projections. The form, shape and alignment of the individual latching projections 11 and 12 are otherwise identical to the first embodiment.

The essential difference between the first and the second embodiment of the invention is that the base body 100 of the second embodiment features a flat and even shape. The projections are directly attached to the level of the base body 100. Due to the form of the base body 100 the cable holding 50 as shown in the second embodiment of the invention, can be preferably used for assembly at even supports.

Figure 16:
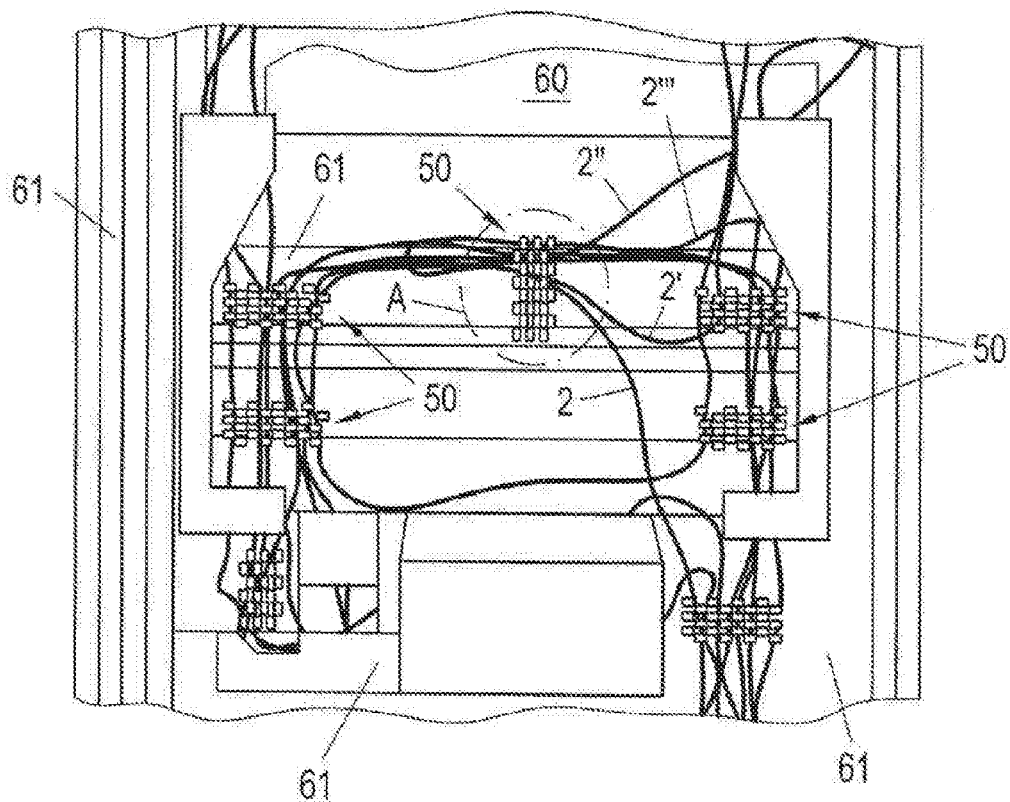
FIG. 16 shows the interior of a device with a number of cable holdings installed therein, as shown in FIG. 9.

In FIG. 16 an interior cabling of a device 60 is represented in more detail, whereby a plurality of cable holdings, as shown in the second embodiment of the invention in FIGS. 9 to 15, is used. In contrast to the embodiments of cable holdings 50 shown in FIGS. 9 to 15, the embodiment of FIG. 16 has cable holdings 50 having four channel areas divided from each other, and which are arranged on a common base body 10.

The cable holdings 50 are bolted via the fastening means 107 of the base plate 10 to or with housing parts of the device 60. Alternatively, a tool-free fastening can be foreseen, for example, the fastening means 107 may be formed by a bore, into which flexible segment sections are arranged so that a rod-shaped body inserted into the bore is fixed through the segment section in a barbed-hook manner. The flexible segment section can be developed from the same material as the base plate 10.

As is apparent from the area bearing the mark A in FIG. 16 the guiding of cables 2, 2', 2'', and 2''' or cable harnesses in device 60 can occur in different ways. The cable holding 50 features four different channel areas 13, whereby all of the cables 2, 2', 2'', and 2''' only run through two of the four channel areas 13, while the remaining channel areas 13 of the cable holding 50 are free of cables 2. A targeted manipulation of a device 60 would however only be possible, if a person performing a manipulation knows the exact position of the individual cables 2, 2', 2'', and 2''' and can conduct an effective interruption from outside. But if the cables 2, 2', 2'', and 2''' are during the production always guided in a different way, then an effective manipulation is made considerably difficult. Through the simple disconnecting and relaying of cables 2, 2', 2'', and 2''' into or out of the channel area 13 a simple new cabling is possible and a manipulation from outside of the individual cables 2, 2', 2'', and 2''' is made more difficult.

The first as well as the second embodiment are developed symmetrically around a level which runs through the central projections 17 and 18 and stands normally at the level determined by the trailing edges.

Figure 17:
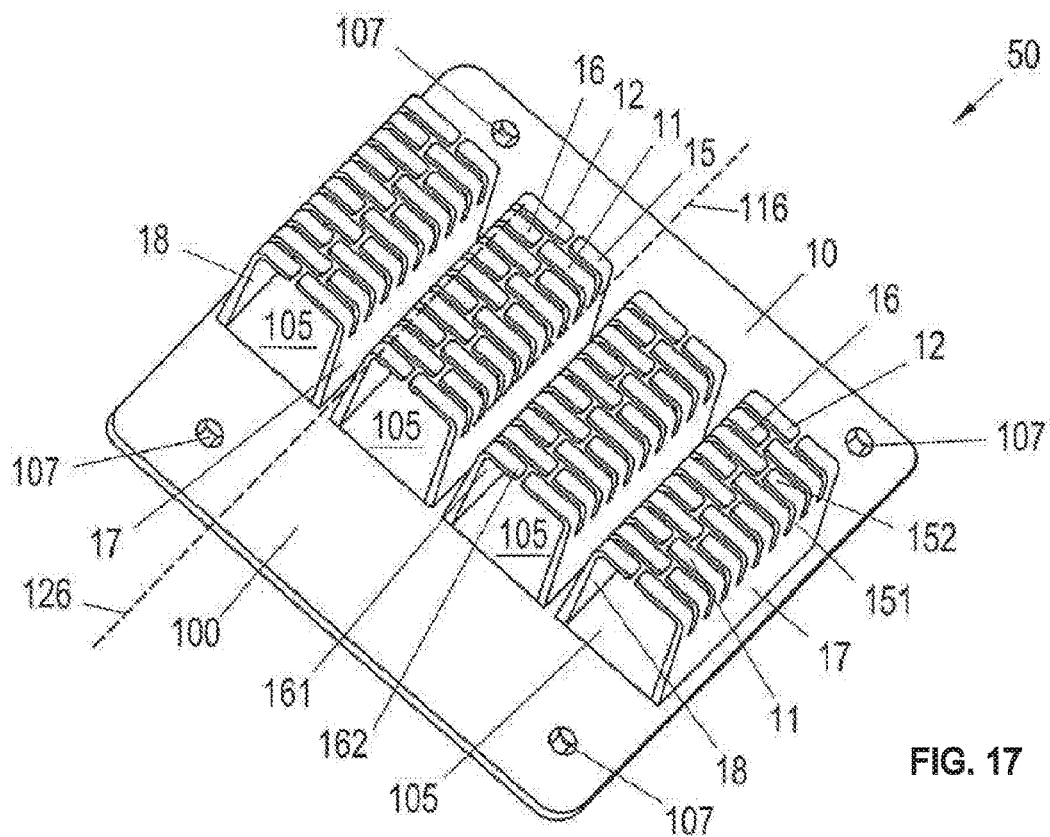
FIG. 17 shows a third embodiment of the invention from an angled view.

A third embodiment of the invention of a cable holding 50 is shown in FIG. 17 and features an even and flat common base body 100, which has four fastening means 107 for the fastening of the common base body 100 or the cable holding 50 to the frame 61 of a device 60. On the common base body 10 there are four cable holding elements 1, which are aligned equidistant and parallel with each other.

Each of the cable holding elements 1 features two projections 17 and 18 which project from the common base body 100 almost vertically or normally. At the end of the projections 17 and 18 distant from the base body 100 latching projections 11 and 12 as well as other latching projections 15 and 16 project. As shown in the previous embodiments the latching projections 11 and 12 comprehend each a first latching projection section 113 and 114 that essentially runs normally with an angle of 70-90°, in particular 85-90°, to the base body 10. Arcs 115 and 125 represent the curvature of the latching projections 11 and 12 and the second latching projection sections 114 and 124 run almost parallel to the base body 10.

The latching projection 11 and 12 project in a comb-like manner from the respective projections 17 and 18, whereby the ends 110 and 120 of the respective latching projections 11 and 12 protrude or are aligned each between two opposite areas 111 and 121 or from the projection 17 and 18 opposite each other.

Those areas 111 and 121 of the cable holding 50 at the end of the projections 17 and 18 distant to the base body 10 run in a parallel manner and lie at the same level. As in the two previous examples the number of latching projections 11 and 12, which project from the areas 111 and 121, are equal.

Alternatively, it can naturally be foreseen for all embodiments of the invention that a deviation between the number of latching projection 11, which project from the first area 111, from the number of latching projections 12, which project from the second area 121, is different. It is particularly advantageous if the respective number of latching projections 11 and 12 projecting from both areas 111 and 121 preferably differ by 1. In particular, in any case a deviation no greater than 1 is possible without detriment to the functionality of the cable holding 50.

FIG. 17 shows an embodiment of the invention where all second latching projection sections 114 and 124 lie at the same level, whereby this level runs parallel to the level of the base body 10.

For each latching projections 11 and 12, of which the end is arranged between two latching projections 11 and 12 of the respective opposite areas 111 and 121, other projecting latching projections 15 and 16 are foreseen, upon which, the ends 151 and 161 are approximated to the end of the respective latching projections 11 and 12 and lies opposite. In the present embodiment also the other latching projections 15, 16 lie at the same level, which runs parallel to the base body 10, in which also the second latching projections 123 and 124 lie. The front sides of the ends 110, 120 151, and 161 of the latching projections 11 and 12 and the other latching projections 15 and 16 lie opposite each other.

The other latching projections 15 and 16 feature a first latching projection section 151 and 161 that projects from the base body 10 or the projection 17 and 18 of the base body 10 essentially normally at an angle of 70°-90°, in particular 85°-90°. The second latching projections 152 and 162, of the other latching projections 15 and 16, extends the first latching projection section 151 and 161 at its end distant to the base body 10. The other latching projections 15 and 16 feature an arc 153 and 163, that connects the respective first and second latching projection sections 151, 152, 161, and 162, whereby the first and the second latching projection sections 151, 152, 161, and 162 are in an almost right angle to each other. The form and alignment of the first and/or second latching projection sections 151, 152, 161, and 162 of the other latching projections 15 and 16 corresponds to the form and alignment of the first and second latching projection sections 113, 114, 123, and 124 of the latching projections 11 and 12.

The length of the first latching projection sections 151 and 161 of the other latching projections 15 and 16 thereby corresponds to the length of the first latching projection sections 113 and 123 of the latching projections 11 and 12. The form and alignment of the first and second latching projection sections 151, 152, 161, 162 of the other latching projections 15 and 16 correspond to the form and alignment of the first and/or second latching projection sections 113, 114, 123, 124 of the latching projections 11 and 12. The other latching projections 15 and 16 and the latching projections 11 and 12 are constructed equally and aligned equally.

As with both previous embodiments, each cable holding element 1 features areas 111 and 121 on the projections 17 and 18, respectively. The latching projections 11 and 12 extend and project from the areas 111 and 121. Those parts of the areas 111 and 121 from which the latching projections project lie each on a straight line 116, 117. Each cable holding element 1 of the cable holding 50 shown in FIG. 17 features two projections 17 and 18.

On the first of the two projections 17 a first area 111 is foreseen on which a number of first latching projections 11 project in direction of the second opposite projection 18. Similarly, on the second projection 18 a second area 121 is foreseen from which a number of the second latching projections 12 project in direction of the first projection 17. All first latching projections 11 project from subareas of the first area 111, which lie on the first straight line 116. All of the second latching projection 12 project from subareas of the second area 121 of the second projection 18, which lie on the second straight line 126.

All first straight lines 116 and second straight lines 126 of the cable holding elements 1 of the cable holding 50 in FIG. 17 lie in a parallel manner to each other.

Also the other latching projections 15, 16 project each from subareas of the first and second area 111 and 121, which lie on the respective first of second straight line 116 and 126. A number of the other latching projections 15 and 16, hereinafter called the first other latching projections 15, project from subareas of the first area 111, which lie on the first straight line 116. The remaining other latching projections, hereinafter called the second other latching projections 16, project from subareas of the second area 121, which lie on the second straight line 126. Between two latching projections 11 and 12, which lie adjacently on one area 111 and 121 a respective other latching projection 15, 16 is arranged. The second latching projection sections 114 and 124 of the latching projections 11 and 12 and the second latching projection sections 152 and 162 of the other latching projections 15 and 16 lie at the same level.

The individual latching projection sections 113, 114, 123, and 124 are developed integrally from a flat body or a profile rod, which has between the first and the second latching projection section 113, 114, 123, and 124 an arc 115, 125. The latching projections 11 and 12 are developed to be elastically bendable and to be resilient, whereby the relation of the width in longitudinal direction of the channel or the cable holding element 1 to the thickness of the latching projections 11 and 12 is between 4:1 to 4:1.5, in the present embodiment the preferable value is 4:1.3.

The entire cable holding 50 consists in the present embodiment of polyethylene. The consistency of the polyethylene is thereby selected in such a manner so that the latching elements have a bending stiffness and elasticity that allow a swivelling of the individual latching elements 11 and 12, so that a cable can be inserted through pressure onto the latching elements 11 and 12 in the channel area 13 and 13'. In addition, in this particular embodiment of the invention the entire cable holding 50 is developed integrally.

Alternatively, the cable holding 50 shown in FIG. 17 can also be made from polypropylene or other synthetic materials that have a similar consistency or material property, in particular elasticity and bending stiffness.

Figure 18:
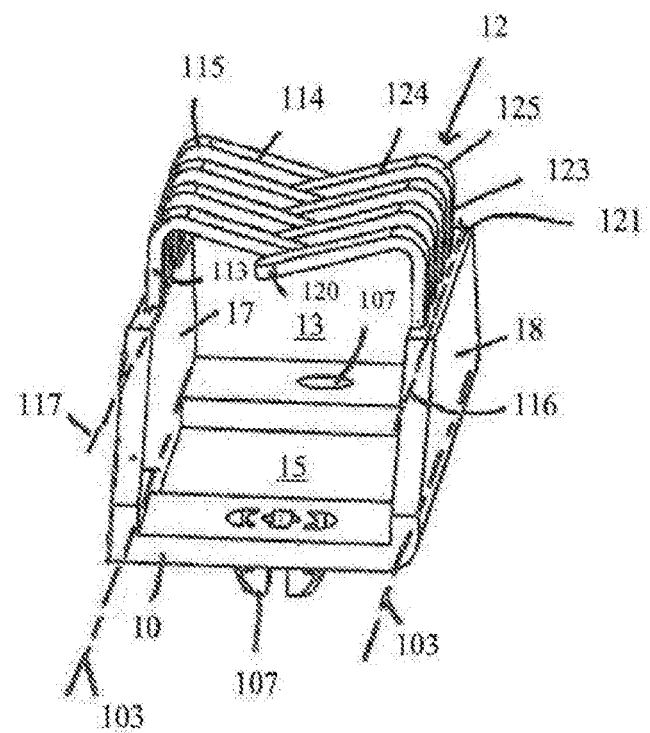
FIG. 18 shows a fourth embodiment of the invention from an angled view.
Figure 12:
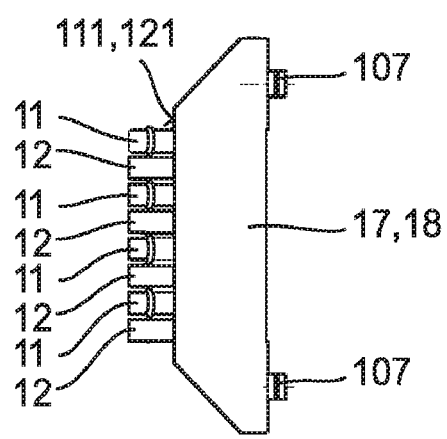
FIG. 12 shows the embodiment of the invention shown in FIG. 9 from the opposite side.
Figure 13:
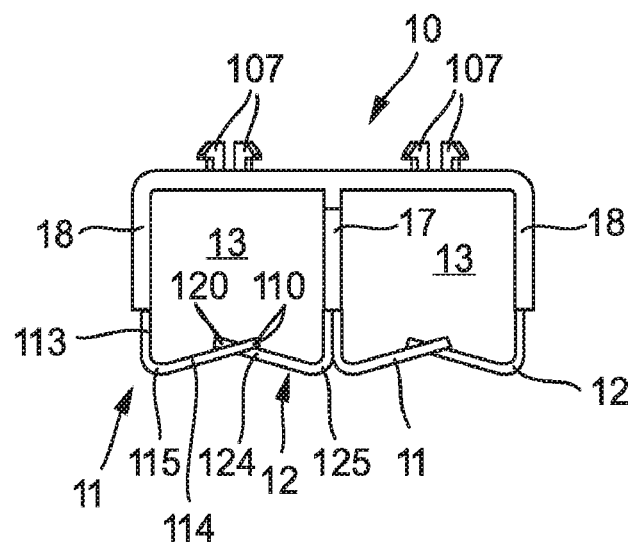
FIG. 13 shows the embodiment of the invention shown in FIG. 9 with a view of the channel area.
Figure 14:
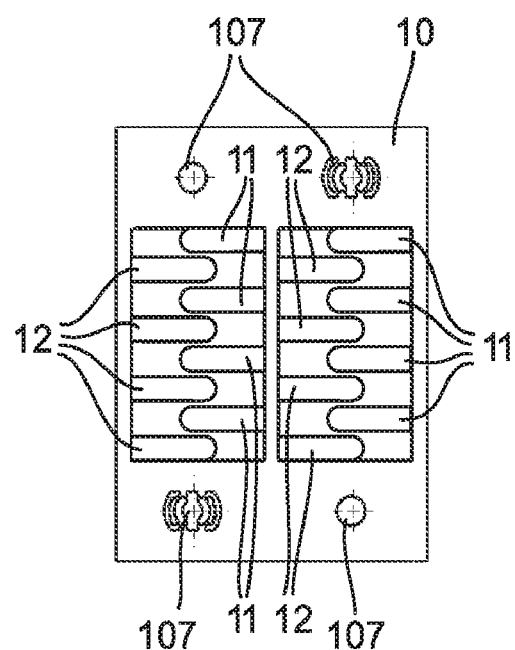
FIG. 14 shows the embodiment of the invention shown in FIG. 9 from above.
Figure 15:
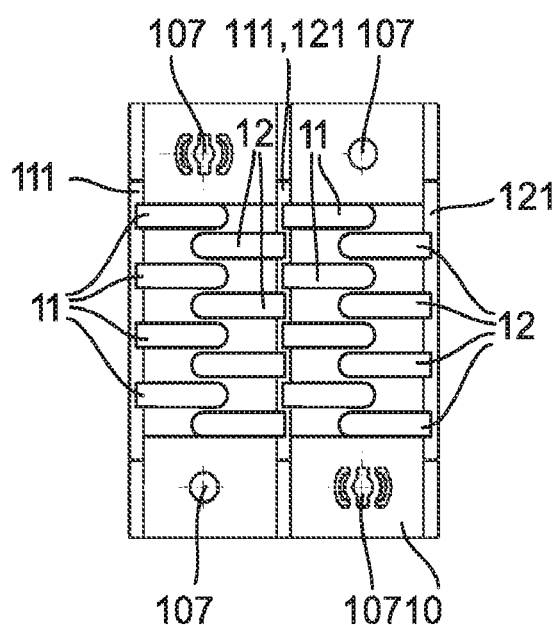
FIG. 15 shows the embodiment of the invention shown in FIG. 9 from below.

Another fourth embodiment of the invention shown in FIG. 18 refers to a single cable holding element 1 with a base body 10. The cable holding element 1 and 1' develops a divided channel area 13. The base body 10 is developed in a plate-shaped manner with a base plate where at the trailing edges 103, the projections 17, 18 project.

These projections 17 and 18 are in the present embodiment developed normally in an upright manner to the level determined by the base plate and are attached to the central bow edge 102 or to the trailing edges 103 and continue these. The projections 17 and 18 extend in profile longitudinal direction across the entire length of the cable holding element 1 and stand normally at the level determined by the trailing edges 103.

At the respective end, distant to the respective trailing edge 103, of the respective projection 17 and 18 a surface with an area 111 and 121 is developed, from which individual latching projections 11 and 12 project.

In relation to the first cable holding element 1, which confines the first channel area 13, the areas 111 and 121 on the distant end of the trailing edge 103 of the projection 17 and 18 and the area on the central projection 17 and 18 are referred to as areas opposite to each other 111 and 121.

In the present embodiment the latching projections 11 and 12—as well as with the remaining embodiments—comprehend each a first latching projection section 113 and 123 as well as a second latching projection section 114 and 124. The latching projections 11 and 12 are developed in an L-shaped or in an angled-hook shape manner and feature each two respective latching projection sections 113, 114, 123, and 124. Each latching projection 11 and 12 features a first latching projection section 113 and 123 and a second latching projection section 114 and 124. The first latching projection sections 113 and 123 stand vertically i.e. normally to the areas 111 and 121 from which they project. The second latching projection section 114 and 124 continues the first latching projection 113 and 123 at its distant end of its respective area 111 and 121.

The latching projection sections 113, 114, 123, and 124 are developed integrally and are developed from a flat body. In the present case curved profile rods are used as latching projections 11 and 12. These profile rods or flat bodies feature between the first and the second latching projection section 113, 114, 123 and 124 each an angle section or an arc 115, 125. This arc 115, 125 can be developed in such a manner that the two latching projection sections 113, 114, 123 and 124 enclose an angle of no less than 90°, in the present case approximately 75°.

The second latching projection sections 123 and 124 project from the end of the first latching projection section in direction of the respective opposite area 111 and 121. The individual latching projections 11 and 12 are arranged in a comb-like manner, that is they are arranged at a distance from each other and are aligned equally, whereby latching projections 11 and 12 projecting all from the same area 111 and 121 of the first cable holding element 1 and 1' have each the same distance to the respectively adjacently arranged latching projections 11 and 12.

The latching projections 11 and 12 project from point on the areas 111 and 121, which each latching projection 11 and 12 are arranged on a common straight line 116 and 117, respectively. The latching projections 11 and 12 opposite each other interlock without contact, whereby the ends 110, 120 of the latching projections 11 and 122 or the ends 110 and 120 of the second latching projection section 114 and 124 are approximated to each other without contact.

Each end 110 and 120 of the respective latching projection 11 and 12 is arranged between two latching projections 11 and 12 of the respective opposite area 111 and 121 or protrudes into the intermediate area between two projecting latching projections 11 and 12 of the opposite area 11 and 12. The individual ends 110 and 120 of the latching projections 11 and 12 or the second latching projection sections 114 and 124 are arranged so that these do not contact the projecting latching projections 11 and 12 of the opposite area 111 and 121. In the present embodiment all latching projections 11 and 12 are equally developed and aligned and do not contact each other.

The alignment of the latching projections 11 and 12 occurs in such a manner that the channel area 13 features a closed cross-section, or a U-shaped channel cross-section.

In the present embodiment the cable holding element 1 comprehends in each case four first latching projections 11 and four second latching projections 12. The ends of the second latching projection sections 123 and 124 are inclined towards the common base body 100 or to the level determined by the trailing edges 103.

For simple assembly two fastening elements 107 are arranged in the area of the base plate, and which facilitate the tool-free and releasable fastening of the cable holding 50 to a and/or with device 60 and/or with its frame 61.

The latching projections 11 and 12 in the present embodiment of the invention are developed to be elastically bendable and to be resilient and consist of synthetic materials, namely polyethylene. The consistency of the polyethylene is thereby selected in such a manner so that the latching elements feature a bending stiffness and elasticity that allow a swivelling of the individual latching elements 11 and 12, so that a cable 2 can be inserted through pressure onto the latching elements 11 and 12 in the channel area 13. After the bending the latching elements 11 and 12 return to their initial position. Alternatively, the cable holding element 1 can also be made from polyethylene or other elastically bendable and resilient synthetic materials.

When inserting a cable 2 the latching projections 11 and 12 are bent by the pressure of the cable 2 in direction of the base body 10 or the common base body 11 and let the cable 2 enter the channel cross-section. If the cable is in the channel cross-section the latching elements 11 return to their initial position due to their elasticity. The latching projections 11 and 12 can thus be resiliently or elastically swivelled at one level normal to the longitudinal direction of the cable holding element 1.

The shown flat-formed latching projections 11 and 12 project from the areas 111 and 121 and confine the channel area 13. The latching projections 11 and 12 are developed in a bent manner as profile parts and feature in their longitudinal direction a flat profile with a constant cross-section. The proceed direction of the latching projection 11 and 12 proceeds at one level normal to the longitudinal direction of the cable holding element 1. The flat profile has in longitudinal direction of the cable holding element 1 an essentially greater extension than in a direction normal to the longitudinal direction of the cable holding element 1. As already mentioned, a relation of 4:1 to 4:1.5, in particular 4:1.3, between the extension of the maximum dimension of the flat profile of the latching projection 11 and 12 in longitudinal direction of the cable holding element 1 and the dimension of the profile of latching projection 11 and 12 in a direction normal thereto is preferable.

An advantageous embodiment is given in the form of a cable holding element 1 for the accommodation of one or multiple cables 2 comprehending a base body 10 as well as a number of latching projections 11 and 12 projecting from the base body 10, that project from areas 111 and 121 opposite each other of the base body 10, whereby the latching projections 11 and 12 and, if applicable, the base body 10 define a channel area 13 for the guiding of cables 2, characterised in that the latching projections 11 and 12 preferably interlock without contact i.e. in a comb-like manner, so that the end 110, 120 of at least one of the latching projections 11 and 12, which project from one area 111 and 121, is arranged and/or protrudes between two latching projections 11 and 12 projecting from the respective opposite area 111 and 121.

A particularly advantageous embodiment is further given in the form of a cable holding element as aforesaid, characterised in that the latching projections 11 and 12 confining the channel area 13 are formed in an L-shape, which are at a distance opposite each other, so that the channel area 13 features a closed cross-section, or a U-shaped channel cross-section. In longitudinal direction of the channel area 13 the latching projections 11 and 12 are arranged in such a manner that these interlock, preferably without contact, in a comb-like manner, so that the end 110, 120 of at least one of the latching projections 11 and 12 is arranged/protrudes between two latching projections opposite each other 11 and 12. The latching projections 11 and 12 are configured to be elastically bendable and to be resilient, so that these can be swivelled against the base body 10 of the cable holding element 1 and after the swivelling return to their initial position.

A particularly advantageous embodiment is further given in the form of a cable holding element 1 as aforesaid, characterised in that the latching projections 11 and 12 are developed in a curved shape, in particular in an angled-hook shape, and feature two latching projection sections 113, 114, 123, 124, whereby the first latching projection section 113, 123 projects in an angle of 70°-90°, preferably 85°-90°, in particular exactly vertically and/or normally, from the respective area 111 and 121 and whereby the second latching projection section 114, 124 continues at the distant end of the respective area of the first latching projection section 113, 123 and projects in an angle, in particular in an angle between 70° to 110°, preferably 90°, to the first latching projection section 113, 123 in direction of the latching projections 11 and 12, which project from the respective areas 111 and 121 opposite each other, and/or that the two latching projection sections 113, 114, 123, 124 are developed integrally, in particular from a flat body and/or a profile rod, which feature between the first and the second latching projection section 113, 114, 123, 124 an arc 115, 125.

A particularly advantageous embodiment is further given in the form of a cable holding element 1 as aforesaid, characterised in that the two latching projection sections 113, 114, 123, 124 enclose an angle of no less than or equal to 90°, and/or that the two areas 111 and 121 from which the latching projections 11 and 12 project run parallel to another and/or lie at one level, and/or that the respective number of latching projections 11 and 12, which project from the two areas 111 and 121, deviate by no more than one, and/or that the ends of the latching projections 11 and 12 or the ends of the second latching projection sections 123, 124 are inclined towards the base body 10.

A particularly advantageous embodiment is further given in the form of a cable holding element 1 as aforesaid, characterised in that for each latching projection 11 and 12, of which the end is arranged between two projecting latching projections 11 and 12 of the respective opposite area 111 and 121, another projecting latching projection 15, 16 from the opposite area 111 and 121 is foreseen, of which the end 150, 160 is approximated to the end of the respective latching projection 11 and 12 and lies opposite, whereby in particular the front sides of the ends 110, 120 150, 160 of the other latching projections 15, 16 and the latching projection 11 and 12 lie opposite each other.

A particularly advantageous embodiment is further given in the form of a cable holding element 1 as aforesaid, characterised in that the other latching projections 15, 16 each feature a first latching projection section 151, 161, that projects from the base body 10 in an angle, in particular in an angle of 70°-90°, preferably 90°, and features a second latching projection section 152, 162, that continues the first latching projection section 151, 152 and projects from the first latching projection section 151, 152, that in particular the form and/or alignment of the first and/or second latching projection section 151, 152, 161, 162 of the other latching projections 15, 16 corresponds to the form and alignment of the first and/or second latching projection sections 113, 114, 123, 124 of the latching projections 11 and 12, and that in particular the length of the first latching projection section 151, 161 of the other latching projections 15, 16 corresponds to the length of the first latching projection section 113, 123 of the latching projections 11 and 12.

A particularly advantageous embodiment is further given in the form of a cable holding element 1 as aforesaid, characterised in that the latching projections 11 and 12 projecting from the first area 111 and/or from the second area 121 are developed and/or aligned equally, and/or that all other latching projections 11 and 12 are developed equally, and/or that the other latching projections 15, 16 projecting from the first area 111 and/or from the second area 121 are developed and/or aligned equally, and/or that all other latching projections 15, 16 are developed equally.

A particularly advantageous embodiment is further given in the form of a cable holding element 1 as aforesaid, characterised in that the latching projections 11 and 12 project from two areas 111 and 121, whereby a number of first latching projections 11 project from the first of both areas 111 and a number of second latching projections 12 project from the second of the two areas 121, and/or that the first latching projections 11 project from subareas of the first area 111, which lie on a first straight line 116 and/or that the second latching projections 12 project from subareas of the second area 121, which lie on a second straight line 126, whereby the first straight line 116 and the second straight line 126 are preferably aligned in a parallel manner to each other, and/or that a number of the other latching projections 15, 16 and/or form subareas of the second area 121 project, which lie on the first straight line 116, and the remaining of the other latching projections 16 project from subareas of the second area 121, which lie on the second straight line 126, and/or that between each of the two latching projections 11 and 12 a respective other latching projection 15, 16 is arranged, and/or that the second latching projection sections 114, 124 of the latching projections 11 and 12, if applicable, also the second latching projection sections 152, 162 of the other latching projections 15, 16 lie at the same level, and/or that the base body 10 features in the areas opposite the latching projections 11 and 12 at least one recess 105.

A particularly advantageous embodiment is further given in the form of a cable holding element 1 as aforesaid, characterised in that the base body 10 features at least one, in particular two, in particular vertically and/or normally, projecting projections 17, 18 from it, of which the individual latching projections 11 and 12 and, if applicable, the other latching projections project 15/16, and/or that the channel cross-section of the channel area 13 narrows and/or extends at least in a subarea along the longitudinal extension of the channel area 13, and/or that the latching projections 11 and 12 are developed to be elastically bendable and/or to be resilient, and/or that the relation of the width in longitudinal direction of the cable holding element 1 to the thickness of the latching projections 11 and 12 is between 4:1 to 4:1.5, in particular 4:1.3.

A particularly advantageous embodiment is further given in the form of a cable holding element 1 as aforesaid, characterised in that the latching projections 11 and 12, if applicable, the other latching projections 15, 16 and/or the entire cable holding element 1, are made from synthetic materials, in particular polyethylene PE and/or polypropylene PP.

A particularly advantageous embodiment is further given in the form of a cable holding 50 comprehending a number of cable holding elements 1 as aforesaid, characterised in that the individual cable holding elements 1 are arranged equally aligned on a common base body 100, whereby preferably the base body 100 features fastening means 107 for, in particular releasable without tools, fastening of cable holdings 50 to a device, in particular with a frame 61 of a device 60, and/or that the common base body 100 in the areas opposite of the latching projections 11 and 12 features at least one recess 105.

A particularly advantageous embodiment is further given in the form of a cable holding 50 as aforesaid, comprehending in particular two cable holding elements 1, characterised in that the common base body 100 develops a W-shaped angle profile 101, whereby the latching projections 11 and 12 of the two cable holding elements 1 project from the central bow edge 102 of the W-shaped angle profile 101 and, in addition, latching projections 11 and 12 of each of the cable holding elements 1 project from the trailing edges 103 of the W-shaped angle profile, and whereby, if applicable, projections project from the bow edge 102 and/or the trailing edge 103, of which the latching projections project 11 and 12, and/or whereby, if applicable, the W-shaped angle profile 101 features in the area of the central bow edge 102, preferably also in both trailing edges 103, 104, a right angle.

A particularly advantageous embodiment is further given in the form of a cable holding 50 as aforesaid, characterised in that the common base body 100 is developed in a flat and/or even manner and the individual latching projections 11 and 12 project towards the same side from the base body 100, and/or that the individual cable holding elements 1 on the base body 100 are arranged equally and, if applicable, are arranged side by side and/or consecutively, and/or that the first and second straight line 116, 117 are arranged in a parallel manner to each other.

A particularly advantageous embodiment is further given in the form of an electronic device, in particular betting and/or gaming device, with a cable holding 50 as aforesaid or with a plurality of cable holding elements 1 as aforesaid.

I claim:

1. A cable holder comprising a number of cable holder elements for receiving one or more cables, which comprises a base body as well as a number of latching projections protruding from the base body, which latching projections protrude from opposite areas of the base body, the latching projections defining a duct area for guiding the cables, wherein:

the individual cable holder elements are arranged on a common base body and aligned equally;
the common base body comprises at least one of a flat surface and a plane;

the individual latching projections protrude from the base body to the same side; and the individual cable holder elements on the base body are aligned either side by side or consecutively;

wherein the common base body features in the areas opposite the latching projections at least one recess, and wherein the common base body comprises fastening means outside of the duct area, for fastening of the cable holder to a device.

2. A cable holder comprising a number of cable holder elements for receiving one or more cables, which comprises a base body as well as a number of latching projections protruding from the base body, which latching projections protrude from opposite areas of the base body, the latching projections defining a duct area for guiding the cables, wherein:

the base body provides a W-shaped angled profile;

the cable holder comprises two cable holder elements;

the latching projections of both cable holder elements protrude from a central crook edge of the W-shaped angled profile; and the latching projections of each one of the cable holder elements also project from at least one trailing edge of the W-shaped angled profile, wherein the base body features in the areas opposite the latching projections at least one recess that extends substantially the length of the areas opposite the latching projections, and wherein the base body comprises fastening means outside of the duct area, for fastening of the cable holder to a device.

3. The cable holder of claim 2, the W-shaped angled profile has a right angle in an area of a central bow edge.

4. The cable holder of claim 3, wherein the W-shaped angled profile also has a right angle at the at least one trailing edge.

5. The cable holder of claim 2, wherein the base body also defines the duct area.

6. The cable holder of claim 2, wherein the base body comprises a first area and a second area and:

wherein the latching projections interlock in a comb like fashion so that an end of at least one of the latching projections protruding from a first area of the base body is arranged between two latching projections protruding from a second area of the base body that is opposite of the first area.

7. The cable holder of claim 2, wherein the latching projections defining the duct area are at least one of:

(i) L-shaped and spaced apart opposite each other so that the duct area has a cross-section that is at least one of (a) closed and (b) U-shaped;

(ii) arranged in a longitudinal extension of the duct area so that they interlock without contact, in a comb like fashion, so that an end of at least one latching projection is arranged between two opposite latching projections; and (iii) formed elastically bendable and resilient so that they are pivotable with respect to the base body of the cable holder element and return to their initial position after pivoting.

8. The cable holder of claim 2, wherein:

the latching projections comprise latching projections along two latching projection sections; and a first latching projection section of the two latching projection sections protrudes at an angle of 70-90°.

9. The cable holder of claim 8, wherein at least one of the following is true:

(i) a second latching projection section of the two latching projection sections is a continuation of the first latching projection section at an end distant from a respective area and protrudes at an angle between 70° to 110° to the first latching projection section in a direction of the latching projections protruding from a respective opposite area, and (ii) the two latching projection sections are formed integrally into a shape comprising at least one of a flat body and a profile rod, which shape has an arch between the first and the second latching projection sections.

10. The cable holder of claim 9, wherein the latching projections along the two latching projection sections are bent.

11. The cable holder of claim 10, wherein the latching projections along the two latching projection sections form a shape of an angled hook.

12. The cable holder of claim 8, wherein the first latching projection section protrudes at an angle of 85-90°.

13. The cable holder of claim 8, wherein the second latching projection section of the two latching projection sections that is the continuation of the first latching projection section protrudes at an angle of 90° to the first latching projection section.

14. The cable holder of claim 8, wherein at least one of the following is true:

(i) the two latching projection sections enclose an angle of less than or equal to 90°;

(ii) the two areas from which the latching projections protrude are positioned such that they at least one of (a) extend in parallel and (b) lie in one plane;

(iii) a respective number of latching projections projecting from the two areas differs by not more than one; and (iv) at least one of (a) ends of the latching projections and (b) ends of the second latching projection sections are tilted towards the base body.

15. The cable holder of claim 2, wherein:

an end of each latching projection protruding from a first area of the base body is arranged between two latching projections protruding from a second area of the base body, the second area being opposite to the first area and wherein at least one further latching projection protrudes from the second area;

an end of the at least one further latching projection is approximate to and opposite of an end of the latching projection protruding from the first area; and respective front sides of the ends of the at least one further latching projection and of the latching projection protruding from the first area are opposite of each other.

16. The cable holder of claim 15, wherein the at least one further latching projection comprises:

a first latching projection section, which protrudes from the base body at an angle of 70° to 110°; and a second latching projection section, which is a continuation of the first latching projection section and protrudes from the first latching projection section, wherein (i) at least one of a shape and orientation of the first latching projection section corresponds to a shape and orientation of the second latching projection section; and (ii) a length of the first latching projection section corresponds to a length of the second latching projection section.

17. The cable holder of claim 15, wherein at least one of the following is true:

the latching projections protruding from at least one of the first area and the second area are formed equally;

the latching projections from at least one of the first area and the second area are oriented equally.

18. The cable holder claim 2, wherein a first number of first latching projections protrude from a first area of the base body and a second number of second latching projections protrude from a second area of the base body and wherein at least one of the following is true:
- (i) the first number of latching projections protrude from partial areas of the first area lying on a first straight line and the second number of latching projections protrude from partial areas of the second area lying on a second straight line, wherein the first straight line and the second straight line are arranged in parallel with each other;
- (ii) the first number of the latching projections and the second number of latching projections lie in a single plane; and
- (iii) the base body has the at least one recess in the areas opposite at least some of the latching projections.

19. The cable holder of claim 2, wherein at least one of the following is true:
- the base body comprises at least one projections protruding therefrom, the at least one projection protruding at an orientation that is at least one of perpendicular and orthogonal, from which at least one projection the latching projections protrude;
- (ii) a duct cross-section of the duct area is modified in size in at least one partial area along a longitudinal extension of the duct area such that it one of expands and tapers;
- (iii) the latching projections are formed such that they are flexible;
- (iv) a range comprising a relation of a width in a longitudinal extension of the cable holder element to a thickness of the latching projections is 4:1 to 4:1.5.

20. The cable holder of claim 2, wherein at least one of a subset of the latching projections and at least one of the cable holder elements are made of plastic, preferably the plastic comprises one of polyethylene PE and polypropylene PP.

21. The cable holder of claim 2, wherein the base body comprises at least one of a fastening means for fastening the cable holder to a device and the at least one recess in the areas opposite the latching projections.

22. An electronic gaming device comprising:
- a cable holder comprising a number of cable holder elements for receiving one or more cables, which comprises a base body as well as a number of latching projections protruding from the base body, which latching projections protrude from opposite areas of the base body, the latching projections defining a duct area for guiding the cables, wherein:
- the individual cable holder elements are arranged on a common base body and aligned equally;
- the common base body comprises at least one of a flat surface and a plane;
- the individual latching projections protrude from the base body to the same side; and
- the individual cable holder elements on the base body are aligned either side by side or consecutively;
- wherein the common base body features in the areas opposite the latching projections at least one recess, and wherein the common base body features in the areas that are not covered by the latching projections fastening means for fastening of the cable holder to a device.

* * * * *